United States Patent [19]

Gesser et al.

[11] 3,925,178

[45] Dec. 9, 1975

[54] CONTACT LENSES

[76] Inventors: Hymie D. Gesser, 218 Girton Blvd., Winnipeg 29, Manitoba; Robert E. Warriner, 106 Longsdale Drive, Winnipeg 22, Manitoba, both of Canada

[22] Filed: June 7, 1974

[21] Appl. No.: 477,265

Related U.S. Application Data

[63] Continuation of Ser. No. 29,635, April 17, 1970, abandoned, which is a continuation-in-part of Ser. No. 449,297, April 19, 1965.

[52] U.S. Cl. ....... 204/165; 204/158 R; 204/158 HE
[51] Int. Cl.$^2$ .......................... B01K 1/00; B01J 1/10
[58] Field of Search ............................ 204/165, 168

[56] References Cited

UNITED STATES PATENTS

| | | | |
|---|---|---|---|
| 3,057,792 | 10/1962 | Frohlich | 204/165 |
| 3,183,152 | 5/1965 | Szekely | 167/59 |
| 3,255,099 | 6/1966 | Wolinski | 204/169 |
| 3,274,088 | 9/1966 | Wolinski | 204/165 |
| 3,274,090 | 9/1966 | Amborski | 204/165 |
| 3,274,091 | 9/1966 | Amborski | 204/165 |

*Primary Examiner*—F. C. Edmundson

[57] ABSTRACT

Plastic contact lenses are treated by exposing the surface to attack by polar functional group forming radicals thereby replacing part of the surface hydrophobic atoms and groups with polar hydrophilic functional groups thus increasing the wettability of the surface.

5 Claims, No Drawings

Title: CONTACT LENSES

This invention relates to new and useful improvements in processes for increasing the wettability of plastic contact lenses, and constitutes a continuation of our application Ser. No. 29,635 filed Apr. 17, 1970, now abandoned, which in turn is a continuation-in-part of our application, Ser. No: 449,297, filed Apr. 19, 1965.

Conventional plastic contact lenses suffer from the disadvantage of poor wettability by the fluids present in the eye.

Consequently a discomfort to the wearer may result and, in addition, dry portions of the lens may lead to undesired optical effects.

Previous attempts have been made to overcome this difficulty but have been limited to the addition of wetting agents to the lens' surface at the time it is placed in contact with the eye. These additives have a very short duration and therefore the overall effect is temporary.

It appears that the treatment or coating of lenses to improve the wetting properties of the plastic has been almost completely neglected due probably to the absence of a convenient low temperature technique which would be applicable to plastic.

It is known that contact lenses have been coated with titanium dioxide or silicone dioxide thus giving improved scratch resistance and improved wettability.

It is believed that the larger surface area of the coated lens increases the susceptibility of the lens to absorption effects. Such coating would therfore have a relatively short life and would have to be replaced.

It is believed that all coatings which are evaporated or hydrolysed onto the plastic would be subject to this surface area effect and thus will be expected to have only limited benefit.

We have overcome the disadvantages of wetting solutions and surface coatings by treating the contact lenses by exposing the surfaces thereof to free radicals thus replacing part of the surface hydrophobic atoms and groups by polar hydrophilic functional groups.

The process used induces permanent chemical change to the surface inasmuch as the hydrophilic groups interact with the surface and are attached to the surface with a permanent chemical bond.

The principal object and essence of this invention is therefore to provide a process for treating plastic contact lenses in order to make the surfaces of said lenses hydrophilic.

Another object of the invention is to provide a process of the character herewithin described which is relatively permanent.

Yet another object of the invention is to provide a process of the character herewithin described in which the optical characteristics of the lens are not changed and in which the physical dimensions of the lens are not changed.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept.

In present practice, the contact lens, as employed by optometrists and the like, consists of accurately formed surfaces of methylmethacrylate plastic or other polymeric material incuding clear silicone rubber whose shape determines the size of the tear which acts as a lens element between the concave surface of the lens and the cornea of the eye.

It is highly desirable that both surfaces of the plastic be readily wetted in order to decrease frictional contact between the eyelid and the convex surface on one side and the cornea and concave surface on the other. This relieves possible irritation and also facilitates the formation of the desired tear shape lens.

Unfortunately, however, methylmechacrylate plastic and almost all other useful polymeric materials are not intrinsically hydrophilic substances. The chemical constitution of this plastic is such as to make direct wetting impossible inasmuch as the molecular groups are not similar in electrical polarity to those present in water.

In the present invention, we describe the treatment of the surfaces of the plastic lens with free radicals in order to provide attached polar functional groups. Such polar groups would be similar to those present in water and will be readily solvated with water.

The free radicals may be generated by a variety of methods. In the present process, electrical discharge through water vapor is employed in order to produce hydroxyl free radicals. However, free radicals can be achieved by radiolysis in the gas phase, photolysis, microwave discharge, and radio frequency discharge.

One method of achieving the desired result is as follows:

The clean dry lens is placed in a gas discharge tube apparatus which is evacuated to approximately 1 micron pressure. The molecular vapors are allowed to diffuse into the discharge tube where the pressure is maintained constant at about 1 mm pressure. A voltage of approximately 10,000 volts A.C. is applied to the electrodes located on either side of the lens and the vapors are decomposed into free radicals.

These radicals were allowed to react with the surface of the plastic lens and an exposure of approximately 5 minutes was found to be adequate and resulted in a distinct and measurable improvement in the wettability of the plastic surfaces.

The compounds used as sources of free radicals are water, hydrazine, ammonia, acetic acid, formic acid, organic amides such as acetamide and formamide, volatile alcohols with high ratio of functional hydroxyl groups to total Carbon atoms, amines such as methylamine or ethylene diamine which furnish high ratios of functional amino groups to total Carbon atoms.

It is desirable that the free radicals are hydroxyl, amino, formyl or carbonyl radicals. The radicals are single groups containing oxygen or nitrogen atoms and if carbon is involved, then they should have not more than five carbon atoms.

If water vapor is used then only half the surface would be replaced by hydroxyl radicals and the other half would be expected to remain hydrogen atoms. If, however, instead of water vapor, hydrogen peroxide were employed, then a larger portion of the surface would be expected to be replaced by hydroxyl radicals.

Furthermore, if ammonia or hydrazine were employed, it is expected that up to two thirds of the surface would be replaced by hydrophilic groups.

It will of course be appreciated that the time of equilibrium replacement of the surface by desirable groups depends on the gas used, the pressure, the discharge current and the location of the lens.

However, it is believed that this information is well known to those skilled in the art so that consequently further details are not deemed necessary.

We have found that the lens should be kept just out of the path of the discharge flow in order to avoid corrosion of the lens' surface.

The action is as follows for methylmethacrylate:

The surface of polymerized methylmethacrylate probably consists of $S\text{-}CH_2\text{-}(CH_2)_n\text{-}CH_2\text{-}S$; $S\text{-}CH_3$; and $S\text{-}OCH_3$ groups where S represents the surface. Such surface groups accounts for the hydrophobic nature of the plastic since these groups do not dissolve in water. It is well known that free radicals such as $H\cdot$; $OH\cdot$; $NH_2\cdot$ etc. can readily abstract a hydrogen atom from an alkyl group. With surface bound alkyl groups, a surface bound free radical will be formed.

$\text{-S-CH}_3 + H\cdot \rightarrow \text{S-CH}_2\cdot + H_2$ The surface bound free radical can now combine with other free radicals present in the gas discharge system as follows:

$$\text{-S-CH}_2\cdot + OH\cdot \rightarrow \text{S-CH}_2\text{-OH}$$

$$\text{-S-CH}_2\cdot + NH_2\cdot \rightarrow \text{S-CH}_2\text{-NH}_2$$

The resulting surface is now hydrophilic because of the polar surface groups which are water soluble. The degree of wetting of contact angle would, in the case of a water vapor discharge system, depend on the relative concentration of $H\cdot$ and $OH\cdot$ in the gas since the reaction $$\text{-S-CH}_2\cdot + H\cdot \rightarrow \text{S-CH}_3$$

must also occur. Thus though complete replacement of the surface by hydrophilic radicals is not possible as yet, at least 50% replacement is very readily accomplished.

Preparation of hydroxyl radicals in the aqueous phase can also be used to treat the surface. For this purpose, the well known Fenton's reagent or its modification was employed. This consists of an acid solution of hydrogen peroxide and ferrous ions, which generates hydroxyl radicals in solution.

However, the lifetime of these radicals is knwon to be shorter than those in the gas phase, thus much longer times are required for surface treatment. However, lenses treated by this method also show a considerable degree of improvement.

The improved wettability of the lenses was measured by contact angles as determined by a method of Adams (The Physics and Chemistry of Surfaces).

Small pieces (1/16 inch × ½ inch × 3 inch) of polymethylmethacrylate sheet (Rohm & Haas) were subjected to the same discharge treatment and used for the determination of contact angles. These contact angles were measured by Adam's method and the average of the advancing and receeding angles were recorded in Table I.

Samples which were allowed to dry in the air still showed improved wetting days and weeks later if the samples were washed with distilled water before being allowed to dry.

TABLE I

Contact Angles for Various Gases and Treatment Times

| Sample Number | Contact Angle Before | Contact Angle After | Treatment Time | Gas |
|---|---|---|---|---|
| 1 | 58° | 17° | 5 | $H_2O$ |
| 2 | 55 | 17 | 10 | $H_2O$ |
| 4 | 55 | 20 | 10 | $H_2O$ |

TABLE I-continued

Contact Angles for Various Gases and Treatment Times

| Sample Number | Contact Angle Before | Contact Angle After | Treatment Time | Gas |
|---|---|---|---|---|
| 7 | 60 | 15 | 7 | $N_2H_4$ |
| 4a | 60 | 18 | 5 | $N_2H_4$ |
| 14 | 55 | 18 | 5 | $N_2H_4$ |
| 3 | 60 | 23 | 5 | $CH_3COOH$ |
| 5 | 65 | 15 | 5 | $CH_3COOH$ |
| 7a | 58 | 10 | 5 | $HCOOH$ |
| 2a | 60 | 15 | 5 | $HCOOH$ |

We have found that contact lenses treated by the process hereinabove described have been most successful and give every indication of solving many of the wettability problems of the contact lens wearer.

It is appreciated, of course, that the abrasive action of the eyelid and the eye fluids may eventually remove sufficient portion of the surface to make a re-treatment of the lens necessary.

However, the treatment by the method described involves no mechanical alteration of the shape of the lens and can readily be accomplished.

We also believe that the increased wettability of the lens' surface facilitates the irrigation of the tear forming lens which otherwise tends to become trapped to a certain degree with untreated lens' surfaces thus leading to possible impairment or irritation to the cornea.

The process here and before described has been applied to the successful wetting of contact lenses made of Silicone Rubber and also to be improved irrigation and metabolism of corneas fitted with fenestrated lenses which had been treated to make the lens and holes wetting.

Contact lenses made of Silicone Rubber (transparent) cannot be worn comfortably in the eye even with wetting solutions presently available. This fact is most surprising and entirely unpredictable. However when such lenses were treated by our wetting process, i.e., an electric discharge through water vapor, the lenses could be worn comfortably and indications are that the wetting process on silicone rubber contact lenses lasts for about 6 months to a year or more.

The flow of water through an orfice, small hole or narrow capillary tube depends on the nature of the wall surfaces, i.e., its wetting characteristics. It has been found that fenestrated contact lenses do not increase the oxygen content in the fluid at the cornea, i.e., the contact lens interfere with the metabolism of the cornea (the cornea is asphyxiated) whether the lens is fenestrated or not. A possible explanation for this is that fluid flow through the holes is not sufficiently great to improve the oxygen and carbon dioxide exchange or transport. We believe that the walls of the holes wetting, the flow of liquid is greatly enhanced thereby improving upon the transport or exchange of oxygen and carbon dioxide at the cornea and minimizes the asphyxiation effect or other metabolic interference. Evidence for this has been obtained by slit lamp experiments on the stained corneal epithelium before and after wetting a fenestrated contact lens. Corneal wrinkling was eliminated after the wetting treatment thus indicating a better respiration or more normal metabolic environment for the cornea.

Various modifications can be made within the scope of the inventive concept which is herein disclosed and/or claimed.

What is claimed to be the present invention is:

1. A process of treating a plastic contact lens to make the total lens surface hydrophilic without changing the optical characteristics or the physical dimensions of the lens, which comprises:
   placing the lens in a vacuum chamber containing water vapor;
   subjecting the molecules of water vapor to the action of a source of an electrical discharge or a radio frequency discharge;
   subjecting substantially the total lens surface to the excited molecules of the water vapor in a vacuum in the range of about 1 micron to 1 millimeter pressure of mercury; and
   maintaining the lens surface in contact with the excited molecules of the water vapor until the lens surface is wettable by human tear fluid.

2. The process of claim 1 in which the lens is clear silicone rubber.

3. The process of claim 1 in which the lens is polymerized methylmethacrylate.

4. The process of claim 1 in which the lens is in contact with the excited molecules of water vapor for at least about 5 minutes.

5. The process of claim 1 in which the lens is spaced from the source of electrical discharge or radio frequency discharge.

* * * * *